United States Patent
Minnich et al.

(10) Patent No.: US 9,706,711 B2
(45) Date of Patent: Jul. 18, 2017

(54) AIR RECYCLING CONVEYING SYSTEM FOR AN AGRICULTURAL HARVESTER

(71) Applicant: CNH America LLC, New Holland, PA (US)

(72) Inventors: Michael J. Minnich, Elizabethtown, PA (US); Shaun A. O'Donnell, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 55 days.

(21) Appl. No.: 14/086,557

(22) Filed: Nov. 21, 2013

(65) Prior Publication Data
US 2015/0135672 A1    May 21, 2015

(51) Int. Cl.
*A01D 46/10*    (2006.01)
*A01D 61/00*    (2006.01)

(52) U.S. Cl.
CPC ............. *A01D 61/00* (2013.01); *A01D 46/10* (2013.01)

(58) Field of Classification Search
CPC ........ A01D 46/08; A01D 46/10; A01D 61/00; A01D 46/087
See application file for complete search history.

(56) References Cited

U.S. PATENT DOCUMENTS

| | | | |
|---|---|---|---|
| 362,041 A | 4/1887 | Sailor | |
| 545,117 A | 8/1895 | Young | |
| 773,357 A | 10/1904 | Webb | |
| 891,191 A | 6/1908 | Shinn et al. | |
| 1,090,606 A | 3/1914 | Epps | |
| 1,711,316 A * | 4/1929 | Higgins | A01D 46/10 56/1 |
| 2,521,051 A * | 9/1950 | Edmonds | A01D 46/10 19/205 |
| 2,672,001 A * | 3/1954 | Bopf | A01D 46/10 56/13.3 |
| 2,689,439 A * | 9/1954 | Martin | A01D 46/10 56/13.2 |
| 2,702,976 A * | 3/1955 | Diserens | A01D 46/10 56/13.2 |
| 2,777,167 A | 1/1957 | Knoth | |
| 2,896,398 A * | 7/1959 | Green | A01D 46/08 346/33 M |

(Continued)

*Primary Examiner* — Alicia Torres
*Assistant Examiner* — Adam Behrens
(74) *Attorney, Agent, or Firm* — Patrick M. Sheldrake

(57) ABSTRACT

A method of harvesting an agricultural product includes guiding the agricultural product through a plurality of inlets in a first direction with a plurality of airflows, separating the agricultural product from the first plurality of airflows, directing the agricultural product to a cross-conveyor, conveying the agricultural product through the cross-conveyor from the plurality of inlets to an outlet in a second direction, and guiding the agricultural product through the outlet in a third direction with a second airflow. The first direction is substantially parallel to a travel direction, the second direction is crosswise to the first direction, and the third direction is substantially parallel to the travel direction. The agricultural product is conveyed through the cross-conveyor substantially without the first plurality of airflows, and the second airflow includes the first plurality of airflows.

19 Claims, 5 Drawing Sheets

(56) References Cited

U.S. PATENT DOCUMENTS

| | | | |
|---|---|---|---|
| 2,904,847 A * | 9/1959 | Burns | D01G 9/08 |
| | | | 209/238 |
| 3,487,450 A * | 12/1969 | Hubbard | A01D 46/08 |
| | | | 406/153 |
| 3,600,041 A * | 8/1971 | Hirano | B65G 53/00 |
| | | | 406/105 |
| 3,881,226 A | 5/1975 | Kent et al. | |
| 4,271,659 A | 6/1981 | McConnell | |
| 4,821,497 A * | 4/1989 | Deutsch | A01D 46/14 |
| | | | 56/30 |
| 6,205,756 B1 * | 3/2001 | Orsborn | A01D 46/08 |
| | | | 56/30 |
| 8,006,471 B2 | 8/2011 | Owen | |
| 2006/0162307 A1 * | 7/2006 | Thompson | A01D 46/10 |
| | | | 56/30 |

* cited by examiner

AIR RECYCLING CONVEYING SYSTEM FOR AN AGRICULTURAL HARVESTER

BACKGROUND

The invention relates generally to agricultural equipment, such as harvesters, and more specifically, to an air recycling conveying system for a harvester.

A harvester may be used to harvest agricultural crops, such as cotton, wheat, flax, or other crops. Generally, components (e.g., drums, spindles, blades, etc.) of the harvester remove portions of the agricultural crops from the ground. The harvester then conveys some of the removed portions of the agricultural crops (e.g., agricultural products) to a processing device. The harvester may generate multiple airflows to direct the agricultural products from inlets proximate to the components of the harvester to the processing device and/or to storage containers. Unfortunately, unbalanced airflows unevenly direct agricultural products from the inlets. In addition, generating multiple airflows to convey the agricultural products throughout the harvester may increase noise and/or energy consumption of the harvester.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an agricultural harvesting system includes an inlet, a cross-conveyor coupled to the inlet, cross-conveyor coupled to the inlet, a circulation system, and an outlet coupled to the cross-conveyor. The inlet is configured to receive an airflow and an agricultural product, and the airflow is configured to guide the agricultural product in a first direction substantially parallel to a travel direction of the agricultural conveyor system. The cross-conveyor conveys the agricultural product from the inlet to an outlet in a second direction crosswise to the first direction. The circulation system is configured to direct the airflow from the inlet to the outlet, wherein the circulation system bypasses the cross-conveyor such that the airflow does not substantially flow through the cross-conveyor in the second direction. The outlet is configured to receive the agricultural product from the cross-conveyor and to receive the airflow from the circulation system. The airflow is configured to guide the agricultural product through the outlet in a third direction substantially parallel to the travel direction.

In another embodiment, an agricultural harvesting system includes a first plurality of inlets, a first cross-conveyor, a circulation system, and a first outlet. Each inlet of the first plurality of inlets is configured to receive a respective first airflow and a respective first agricultural product flow. Each first airflow is configured to guide the respective first agricultural product flow in a first direction through a respective inlet of the first plurality of inlets, and the first direction is substantially parallel to a travel direction of the agricultural harvesting system. The first cross-conveyor is coupled to the first plurality of inlets, and the first cross conveyor is configured to convey the first agricultural product flows from the first plurality of inlets to a first outlet in a second direction crosswise to the first direction. The first plurality of inlets is arranged along a first longitudinal axis of the first cross-conveyor. The circulation system is configured to direct the first airflows from the first plurality of inlets to the first outlet, wherein the circulation system bypasses the first cross-conveyor such that the first airflows do not substantially flow through the first cross-conveyor in the second direction. The first outlet is coupled to the first cross-conveyor and is configured to receive the first agricultural product flows from the first cross-conveyor and to receive the first airflows from the circulation system. The first airflows are configured to guide the first agricultural product flows through the first outlet in a third direction substantially parallel to the travel direction.

In another embodiment, a method of harvesting an agricultural product includes guiding the agricultural product through a plurality of inlets in a first direction with a plurality of airflows, separating the agricultural product from the first plurality of airflows, directing the agricultural product to a cross-conveyor, conveying the agricultural product through the cross-conveyor from the plurality of inlets to an outlet in a second direction, and guiding the agricultural product through the outlet in a third direction with a second airflow. The first direction is substantially parallel to a travel direction, the second direction is crosswise to the first direction, and the third direction is substantially parallel to the travel direction. The agricultural product is conveyed through the cross-conveyor substantially without the first plurality of airflows, and the second airflow includes the first plurality of airflows.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The embodiments of the agricultural conveyor system discussed herein relate to using an airflow to direct an agricultural product (e.g., cotton) in a first direction, and a cross-conveyor to direct the agricultural product in a different second direction. The cross-conveyor may be a mechanical conveyor system, such as an auger, conveyor belt, drive rolls, reciprocating piston, and so forth. In some embodiments, the airflow directs the agricultural product to the cross-conveyor, the airflow is separated from the agricultural product, the airflow bypasses the cross-conveyor such that the airflow does not substantially flow through the cross-conveyor, and the airflow guides the agricultural product through an outlet. A bypass duct may direct the airflow from the inlet to the outlet, thereby bypassing the cross-conveyor. The bypass duct may receive the airflow from one or more inlets after separation of the airflow from the agricultural product. A fan, such as a Rembert fan, may direct the airflow through the one or more inlets, the bypass duct, and the outlet. Multiple inlets that receive the airflow and the agricultural product may be balanced with respect to pressure and/or quantity of the airflow, thereby enabling each of the inlets to direct a similar quantity of the harvested agricultural product to a storage bin. The inlets may be balanced via flow controls (e.g., dampers) and/or the design of the inlets (e.g., length, diameter, shape). The agricultural conveyor system may be incorporated within a harvester or within in a header, which may, in turn, be coupled to a prime mover (e.g., harvester).

Figure 1:
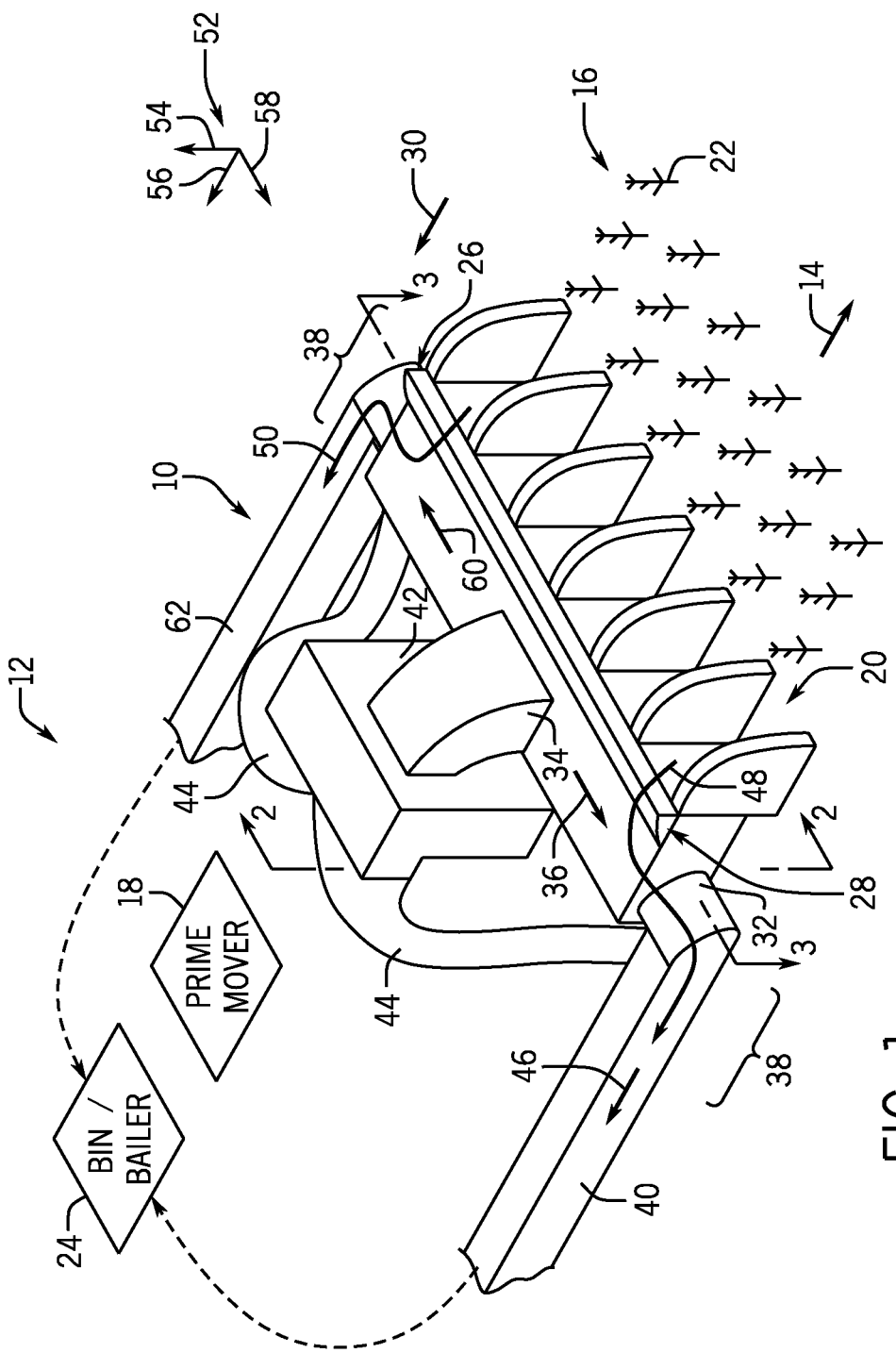
FIG. 1 is a perspective view of an embodiment of an agricultural conveyor system.

Turning now to the drawings, FIG. 1 is a perspective view of an embodiment of an agricultural conveyor system 10. In some embodiments, the agricultural conveyor system 10 and a coupled harvester system 12 move in a travel direction 14 across a field 16. The harvester system 12 includes a prime mover 18 (e.g., tractor) to move the agricultural conveyor system 10 across the field 16 and to drive components of the agricultural conveyor system 10. The agricultural conveyor system 10 may be incorporated within the prime mover 18, or removably coupled to the prime mover 18 as a header. One or more inlets 20 receive and process crops 22 from the field 16 as the harvester system 12 moves in the travel direction 14. The processed crops are herein referred to as agricultural products.

The agricultural conveyor system 10 utilizes airflow to convey agricultural product (e.g., cotton) from the one or more inlets 20 to a bin 24 or packager. The bin 24 may be incorporated with the prime mover 18 of the harvester system 12, separately coupled to the prime mover 18, or arranged adjacent to (e.g., alongside or behind) the harvester system 12. One or more intakes 26 receives an incoming airflow into a receiving portion 28, where the incoming airflow mixes with the agricultural product from the one or more inlets 20. The airflow in the receiving portion 28 directs the agricultural product in a first direction 30 (e.g., front to back) substantially parallel to the travel direction 14.

As discussed in detail below, the agricultural product is separated from the airflow in the receiving portion 28. The separated agricultural product flows to a cross-conveyor 32, and the airflow enters a bypass intake 34. The cross-conveyor 32 conveys the agricultural product in a second direction 36 (e.g., lateral) to a blow box portion 38 coupled to an outlet 40. The second direction 36 is crosswise (e.g., substantially perpendicular) to the first direction 30. A circulation system 42 (e.g., including a fan) pulls the airflow through the bypass intake 34, and guides the airflow through a bypass duct 44 to the blow box portion 38. In the blow box portion 38, the airflow mixes with the agricultural product and conveys the agricultural product in a third direction 46 toward the bin 24. The third direction 46 may be crosswise (e.g., substantially perpendicular) to the second direction 36 and substantially parallel to the first direction 30 and the travel direction 14.

In some embodiments, multiple outlets 40 may convey the agricultural product to the bin 24 from multiple cross-conveyors 32. For example, a symmetrical agricultural conveyor system 10 may convey a first portion of the agricultural product from a first cross-conveyor to the bin 24 via a first pathway 48 and a second portion of the agricultural product from a second cross-conveyor to the bin 24 via a second pathway 50. The circulation system 42 may have one or more fans to provide the airflow to convey the agricultural product from the inlets to the one or more cross-conveyors 32, and from the cross-conveyors 32 to the bin 24.

Figure 2:
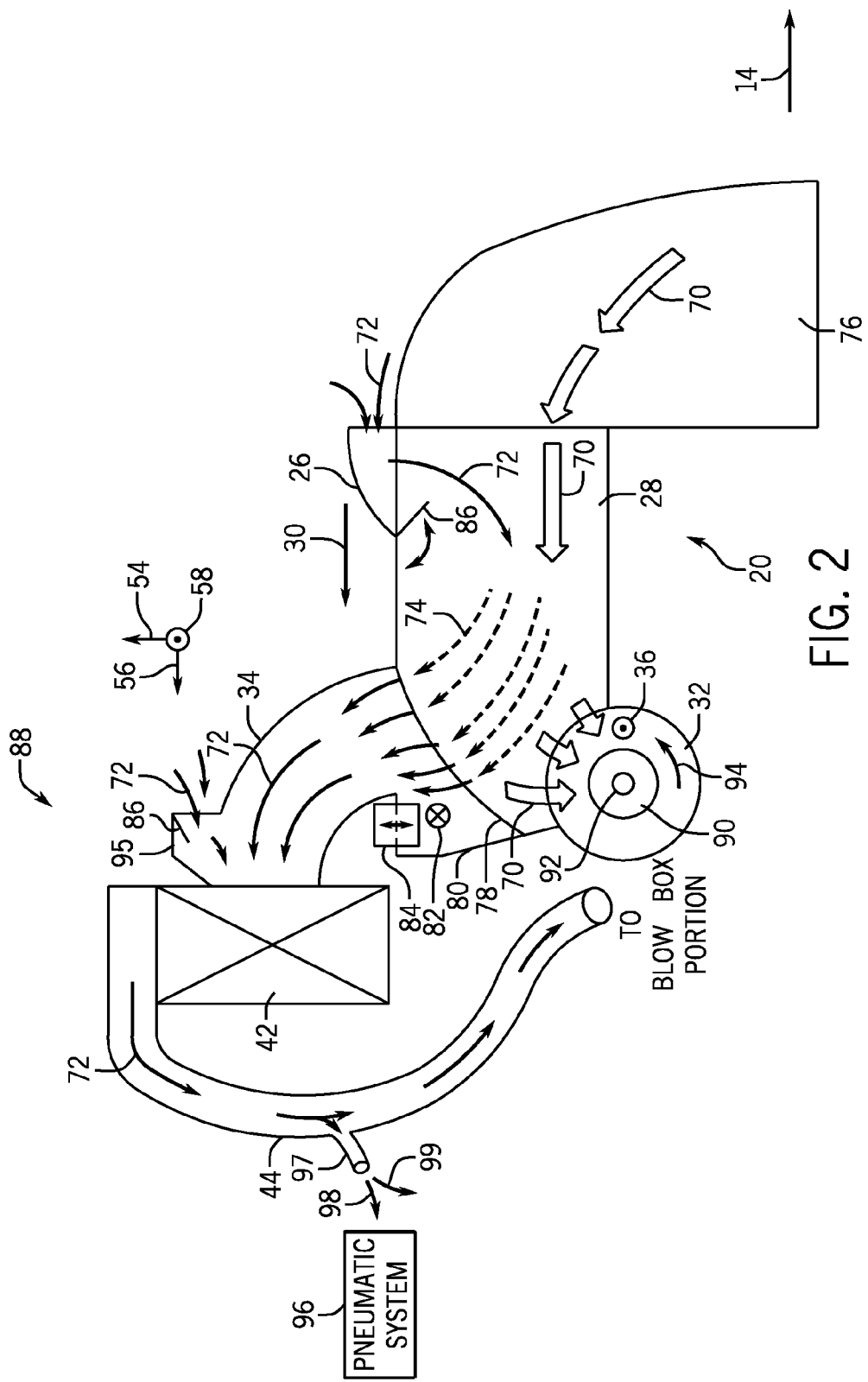
FIG. 2 is a cross-sectional view of the agricultural conveyor system of FIG. 1, taken along line 2-2.
Figure 3:
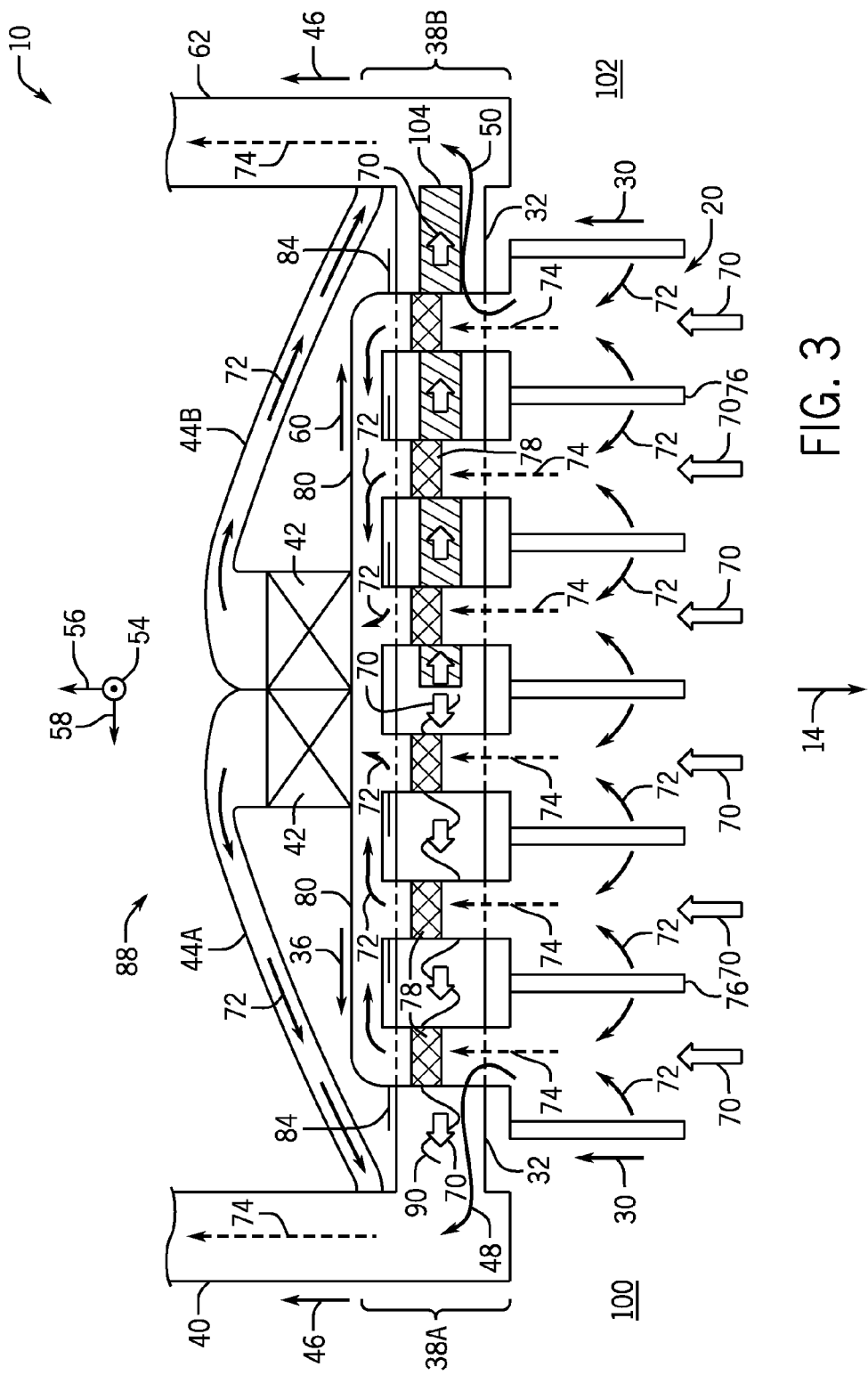
FIG. 3 is a cross-sectional view of the agricultural conveyor system of FIG. 1, taken along line 3-3.

The embodiments shown in FIGS. 1-3 illustrate the agricultural conveyor system 10 relative to a consistent set of coordinate axes 52. The Y-axis 54 is the vertical direction extending substantially perpendicular to a plane of the field 14. A component may be referred to herein as above or below another component relative the Y-axis 54. The X-axis 56 is parallel to the travel direction 14 and substantially parallel to the plane of the field 14. The X-axis 56 points from a front (e.g., the inlets 20) of the harvesting system 12 to a rear (e.g., the bin 24) of the harvesting system 12. The first and third directions 30, 46 are substantially parallel with the X-axis 56. The Z-axis 58 is substantially perpendicular to the travel direction 14 and parallel to the plane of the field 14. The Z-axis 58 extends across the harvesting system 12 and points from a lateral edge (e.g., left edge) to another lateral edge (e.g., right edge). As shown, the second direction 36 along the cross-conveyor 32 is substantially parallel to the Z-axis 58. In some embodiments, a second cross-conveyor conveys a portion of the agricultural product in a fourth direction 60 parallel to the Z-axis 58 and along the second pathway 50 to a second outlet 62.

Figure 4:
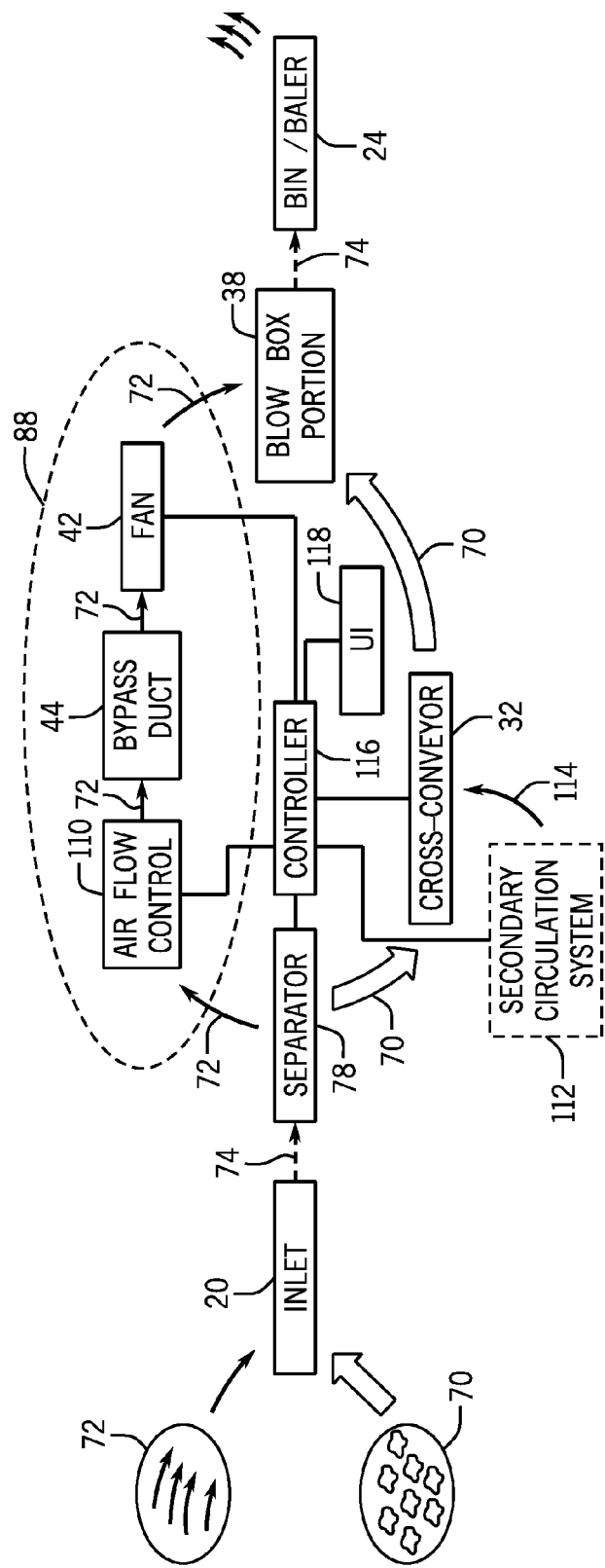
FIG. 4 is a flow diagram of an embodiment of an agricultural conveyor system.

FIG. 2 is a cross-sectional view of the agricultural conveyor system 10, taken along line 2-2 of FIG. 1. Various flows are shown in FIGS. 2-4 with different arrow styles for clarity. Agricultural product flows 70 are shown as hollow arrows, airflows 72 are shown as solid line arrows, and mixed flows 74 of the agricultural product and airflows are shown as dash arrows. The agricultural product flow 70 enters the receiving portion 28 of the inlet 20 in the first direction 30 from a row unit 76. The row unit 76 may include, but is not limited to, drums, spindles, blades, wheels, or any combination thereof. In some embodiments, the row unit 76 may harvest the agricultural product from crops in the field. The airflow 72 enters the receiving portion 28 in the first direction 30 through the intake 26. In some embodiments, the airflow 72 enters the receiving portion 28 through the row unit 76. Within the receiving portion 28 of the inlet 20, the airflow 72 entrains the agricultural product flow 70, thereby establishing the mixed flow 74 in the first direction 30 toward the cross-conveyor 32.

Within the inlet 20, the agricultural product flow 70 and the airflow 72 are separated from the mixed flow 74. In some embodiments, a separator 78 (e.g., screen, filter, mesh) enables the airflow 72 to pass through the separator 78 to a manifold 80. The separator 78 may extend across the inlet 20, thereby enabling the separation of a substantial portion of the agricultural product flow 70 from the airflow 72. The separator 80 directs (e.g., channels, funnels) the agricultural product flow 70 to the cross-conveyor 32, and directs the airflow 72 to the manifold 80. Additionally, or in the alternative, the gravity may guide the agricultural product flow 70 from the separator 78 to the cross-conveyor 32, which is arranged below the separator 78.

The manifold 80 may collect the airflows 72 from multiple inlets 20 arranged along the Z-axis 58. As shown by arrow 82, the manifold 80 may guide the airflow 72 along the Z-axis 58 toward the bypass intake 34. The bypass intake 34 directs the combined airflows 72 from the one or more inlets 20 to the circulation system 42. In some embodiments, one or more manifold dampers 84 in the manifold 80 may control a quantity and/or pressure of the airflow 72 that enters the manifold 80 from each inlet 20. Thus, each inlet 20 may have a corresponding damper 84 to facilitate individual control of the airflows through the inlets, thereby balancing the airflows. Additionally, or in the alternative, one or more intake dampers 86 may control the airflow 72 entering the intake 26 of an inlet 20. As may be appreciated, obstructing the airflow 72 of an inlet 20 with the manifold dampers 84 or intake dampers 86 may reduce the airflow 72 through each inlet 20, thereby reducing the agricultural product 70 conveyed by the airflow 72 to the cross-conveyor 32.

The circulation system 42 directs the airflow 72 through a bypass conduit 88, thereby directing the airflow 72 to bypass the cross-conveyor 32. The bypass conduit 88 includes the manifold 80, the bypass intake 34, the circulation system 42, and the bypass duct 44. The circulation system 42 pulls the airflow 72 through the manifold 80 and the bypass intake 34, and outputs the airflow 72 through the bypass duct 44. Arranging the circulation system 42 within the bypass conduit 88 enables the agricultural conveyor system 10 to utilize the incoming airflow 72 through the inlet 20 and the outgoing airflow 72 through the bypass duct 44 to convey the agricultural product flow 70. That is, the airflow 72 that directs the agricultural product flow 70 from the inlet 20 to the cross-conveyor 32 may also direct the agricultural product flow 70 from the blow box portion 38 to the bin 24. Using a single airflow to convey product through multiple portions of the conveyor system increases the efficiency of the agricultural conveyor system 10 and/or may decrease the noise of the agricultural conveyor system 10 during operation. Moreover, as discussed above, the arrangement of the manifold 80, the manifold dampers 84, and/or the intake dampers 86 may balance the pressure of the airflow 72 across the multiple inlets 20, thereby increasing the uniformity of the harvested agricultural product across the inlets 20 of the agricultural conveyor system 10.

The circulation system 42 may include, but is not limited to, a fan, an impeller, a ducted fan, a Rembert-type fan, and so forth. In some embodiments, the circulation system 42 directs the airflow 72 through the bypass conduit 88 even though some of the agricultural product flow 70 may pass through the separator 78. That is, the circulation system 42 may accommodate some agricultural product flow 70 (e.g., less than approximately 10, 20, or 30 percent of the total agricultural product flow 70) through the bypass conduit 88. The bypass duct 44 directs the airflow 72 to the blow box portion 38, where the airflow 72 directs the agricultural product flow 70 in the third direction 46 to the bin 24 as the mixed flow 74. In some embodiments, the inlet 20, the cross-conveyor 32, and the bypass conduit 88 are arranged to enable the mixed flow 74 (e.g., the agricultural product flow 70 and the airflow 72) to flow in substantially one direction (e.g., first direction 30) through the agricultural conveyor system 10, while the separated flows are individually directed to flow in other directions. For example, the bypass conduit 44 may direct the airflow 72 in various directions (e.g., along the Y-axis 54, along the Z-axis 58 as shown by arrow 82) between the separator 78 and the blow box portion 38, and the cross-conveyor 32 directs the agricultural product flow 70 in the second direction 36 from the separator 78 to the blow box portion 38.

The cross-conveyor 32 may receive a substantial portion of the agricultural product flow 70 from the inlet 20 via the separator 78. The cross-conveyor 32 conveys the received agricultural product flow 70 in the second direction 36 (e.g., lateral direction) crosswise (e.g., substantially perpendicular) to the first direction 30. The cross-conveyor 32 may be a mechanical conveying system, including, but not limited to, an auger 90, a conveyor belt, drive rolls, a reciprocating piston, or any combination thereof. In some embodiments, the auger 90 may spin about an axis 92, as shown by arrow 94, thereby pushing the agricultural product flow 70 in the second direction 36. The cross-conveyor 32 may be vertically inclined or declined to facilitate conveyance of the agricultural product flow 70. For example, the auger 90 may be inclined or declined less than approximately 20, 15, 10, or 5 degrees from horizontal toward the blow box portion 38. The separator 78 and the manifold 80 may be arranged relative to the cross-conveyor 32 such that a substantial portion of the airflow 72 flows through the bypass conduit 88, and substantially none of the airflow 72 flows through the cross-conveyor 32. Likewise, a substantial portion of the agricultural product flow 70 flows through the cross-conveyor 32, thereby reducing a quantity of the agricultural product flow 70 through the bypass conduit 88.

In some embodiments, an auxiliary inlet 95 coupled to the bypass intake 34 receives additional airflow 72 into the bypass conduit 88, thereby enabling the airflow 72 into the outlet 40 to be greater than the airflow 72 through the receiving portion 28. The additional airflow 72 into the bypass intake 34 may be utilized to increase the speed, pressure, and/or flow rate of the agricultural product flow 70 through the outlet 40 to the blow box portion 24. The auxiliary inlet 95 may have one or more intake dampers 86 to control the airflow 72 entering the auxiliary inlet 95. Through control of the intake dampers of the auxiliary inlet 95, a controller and/or a user may control the speed, pressure, and/or flow rate of the airflow 72, thereby affecting the agricultural product flow 70. In some embodiments, a pneumatic system 96 of the harvester system 12 may utilize a portion of the additional airflow 72 received through the auxiliary inlet 95. Additionally, or in the alternative to the auxiliary inlet 95, some embodiments may include one or more auxiliary outlets 97 coupled to the bypass duct 44. The auxiliary outlet 97 may enable the airflow 72 into the outlet 40 to be less than the airflow 72 through the receiving portion 28 or the circulation system 42. The auxiliary outlet 97 may bleed a portion 98 of the airflow 72 to the pneumatic system 96 and/or may vent a portion 99 of the airflow 72 to the external environment. In some embodiments, the auxiliary outlet 97 is a bleed valve. The auxiliary outlet 97 may be controlled to affect the speed, pressure, and/or flow rate of the agricultural product flow 70 through the outlet 40 to the blow box portion 24. For example, increasing the airflow 72 through the auxiliary outlet 97 may decrease the speed, pressure, and/or flow rate of the agricultural product flow 70 through the outlet 40. Accordingly, through control of the intake dampers 86 of the auxiliary inlet 95, and through control of the auxiliary outlet 97, the controller and/or the user may control the speed, pressure, and/or flow rate of the airflow 72 through the bypass conduit 88. The airflow 72 through the receiving portion 28 may be varied relative to the airflow 72 into the outlet 40, while at least some of the airflow 72 from the receiving portion 28 bypasses the cross-conveyor 32.

FIG. 3 is a cross-sectional view of the agricultural conveyor system 10, taken along line 3-3 of FIG. 1. As discussed above, the agricultural product flow 70 and airflow 72 enter the inlets 20 and establish the mixed flow 74 that flows in the first direction 30 substantially parallel and opposite to the travel direction 14 of the agricultural conveyor system 10. The mixed flow 74 flows through the inlet 20 to the separator 78. The separator 78, in turn, separates the mixed flow 74 into the constituent agricultural product flow 70, which is directed to the cross-conveyor 32, and the airflow 72, which passes through the separator 78 to the manifold 80. Manifold dampers 84 control the quantity and/or the pressure of the airflow 72 from each inlet 20, thereby controlling the entrained agricultural product flow 70, which flows from each inlet 20 to the cross-conveyor 32 as the respective mixed flow 74. The circulation system 42 of the bypass conduit 88 directs the airflows 72 from the manifold 80 into one or more bypass ducts 44. The cross-conveyor 32 guides the agricultural product flow 70 in the second direction 36 to the blow box portion 38. In the blow box portion 38, the airflow 72 mixes with the agricultural product flow 70 to form the mixed flow 74, which flows in the third direction 46 (e.g., parallel to the first direction 30) toward the bin 24 through the outlet 40. The bypass duct 44 may couple with the blow box portion 38 upstream or downstream from where the cross-conveyor 32 couples with the blow box portion 38.

In certain embodiments, the agricultural conveyor system 10 includes multiple components, such as inlets 20, cross-conveyors 32, blow box portions 38, outlets 40, circulation systems 42, bypass ducts 44, or any combination thereof. While six inlets are shown in FIG. 3, other embodiments of the agricultural conveyor system 10 may have 1, 2, 3, 4, 5, 7, 8, 9, 10, 12, 14, 16, 18, or more inlets 20. In some embodiments, one cross-conveyor 32 may receive the agricultural product flow 70 from all of the inlets 20, and direct the total agricultural product flow 70 to a first side 100 or a second side 102 of the agricultural conveyor system 10. In a similar manner, one circulation system 42 may receive the airflow 72 from all of the inlets 20, and direct the total airflow 72 through the bypass duct 44 to the first or second side 100, 102 of the agricultural conveyor system 10.

In some embodiments, the agricultural conveyor system 10 may divide the agricultural product flows 70 and airflows 72 from the inlets into separate pathways (e.g., first pathway 48 and second pathway 50). For example, multiple cross-conveyors 32 may receive the agricultural product flow 70 from the inlets 20, with each cross-conveyor 32 receiving a portion of the total agricultural product flow 70. The cross-conveyors 32 may be of the same type, or different types. For example, the cross-conveyor 32 on the first side 100 may be the auger 90 that directs the agricultural product flow 70 to a first blow box portion 38A on the first side 100. The cross-conveyor 32 on the second side 102 may be a conveyor belt 104 that directs the agricultural product flow to a second blow box portion 38B on the second side 102. Multiple cross-conveyors 32 may utilize the same or different type of system to convey the agricultural product flow 10.

The one or more cross-conveyors 32 may direct the agricultural product flow 70 in the second direction 36 to the blow box portion 38 substantially without utilizing the airflow 72. The second direction 36 is crosswise (e.g., substantially perpendicular) to the first direction 30 and to the third direction 46. In some embodiments, the first direction 30 is the same as the third direction 46 (e.g., front to back) and substantially parallel to the X-axis 56. In further embodiments, the second direction 36 may be angled relative to the Z-axis 58 in the direction of the X-axis 56 to facilitate conveyance of the agricultural product flow 70 to the blow box portion 38. For example, the cross-conveyor 32 at the blow box portion 38 may be angled less than approximately ±20, 15, 10, or 5 degrees relative to the Z-axis 58. Accordingly, the second direction 36 may be defined herein as crosswise to the first direction 30 when the second direction 36 is angled more than approximately 70, 75, 80, or 85 degrees from the first direction 30.

Additionally, the bypass conduit 88 includes one or more circulation systems 42 to direct the airflow 72 through the agricultural conveyor system 10. For example, the output airflow 72 from one circulation system 42 (e.g., a single fan) may be divided between a first bypass duct 44A on the first side 100 and a second bypass duct 44B on the second side 102. The shared circulation system 42 between the bypass ducts 44A, 44B may improve the efficiency of the agricultural conveyor system 10. In some embodiments, the first bypass duct 44A and the second bypass duct 44B may each have a respective circulation system 42. Separate circulation systems 42 may enable individual control of the airflow 72 through respective inlets 20 of the each circulation system 42.

FIG. 4 is a flow diagram of an embodiment of an agricultural conveyor system 10. The agricultural product flow 70 (e.g., cotton, wheat, flax) and the airflow 72 enter the inlet 20, thereby establishing a mixed flow 74. The mixed flow 74 passes through the inlet 20 in the first direction 30 to the separator 78. At the separator 78, the agricultural product flow 70 and the airflow 72 diverge along separate routes through the agricultural conveyor system 10. In the illustrated embodiment, the airflow 72 passes through air flow control components 110, such as manifold dampers 84 and/or intake dampers 86, that control the quantity and/or the pressure of the airflow 72 through the bypass conduit 88. The airflow 72 is directed through the bypass duct 44 by the circulation system 42, which may include a fan. The circulation system 42 may be arranged at any location within the bypass conduit 88 relative to the airflow control 110 and the bypass duct 44. For example, the circulation system 42 may be disposed between the manifold 80 and the bypass duct 44, as shown in FIGS. 1-3. In some embodiments, the circulation system 42 may be directly coupled to the blow box portion 38 and configured to circulate the airflows 72 through the inlets 20, the manifold 80, and the bypass duct 44.

The cross-conveyor 32 conveys the agricultural product flow 70 in the second direction 36 from the separator 78 to the blow box portion 38. As discussed above, the cross-conveyor 32 may be a mechanical conveyor system, such as an auger 90 or conveyor belt 104. In some embodiments, the cross-conveyor may include a secondary circulation system 112 that circulates a secondary airflow 114 to convey the agricultural product flow 70 in the second direction 36. The secondary airflow 114 is separate from the airflow 72 through the bypass conduit 88. The secondary airflow 114 may convey the agricultural product flow 70 to the blow box portion 38. In some embodiments, the secondary airflow 114 joins the airflow 72 in the blow box portion 38 to establish the mixed flow 74 through the outlet 40. Additionally or in the alternative, at least some of the secondary airflow 114 may be vented from the blow box portion 38 to an external environment.

In the blow box portion 38, the airflow 72 directs the agricultural product flow 70 as the mixed flow 74 through the outlet 40 to the bin 24 or packager. The agricultural product flow 70 may accumulate in the bin 24 and/or be formed into bales. The airflow 72 may be vented from the bin 24 to the external environment. Accordingly, the agricultural conveyor system 10 receives the airflow 72 through the inlet 20, directs the airflow 72 internally to convey the agricultural product flow 70 through at least two portions of the agricultural conveyor system 10 (e.g., the inlet 20 and the outlet 40), and exhausts the airflow 72 through the bin 24 or packager. A substantial portion of the airflow 72 received from the inlet 20 may be released (e.g., vented) through the bin 24. In some embodiments, some of the airflow 72 may be vented from the outlet 40.

In some embodiments, a controller 116 controls components of the agricultural conveyor system 10. The controller 116 may control the airflow controls 110 to adjust the airflow 72 and the agricultural product flow 70 through the one or more inlets 20. The controller 116 may control the circulation system 42 to control the speed and/or the quantity of the airflow 72 through the one or more inlets 20 and blow box portion 38. For example, a relatively large airflow 72 may enable the circulation system 42 to direct a heavier agricultural product flow to the bin 24 than a relatively small airflow. The controller 116 may also control the one or more cross-conveyors 32, such as to adjust a speed or flow rate of the agricultural product flow 70 along the one or more cross-conveyors 32. In some embodiments, the controller 116 may differentially control multiple cross-conveyors 32 to accommodate different conditions (e.g., density, moisture content) of the agricultural product flow 70. The controller 116 may also control the secondary circulation system 112. The controller 116 may control the components of the agricultural conveyor system 10 based at least in part on input received through a user interface 118. In some embodiments, the controller 116 may control components of the agricultural conveyor system 10 to maintain a flow rate of the agricultural product flow 70 to the bin 24 within a desired range or above a desired minimum flow rate.

Figure 5:
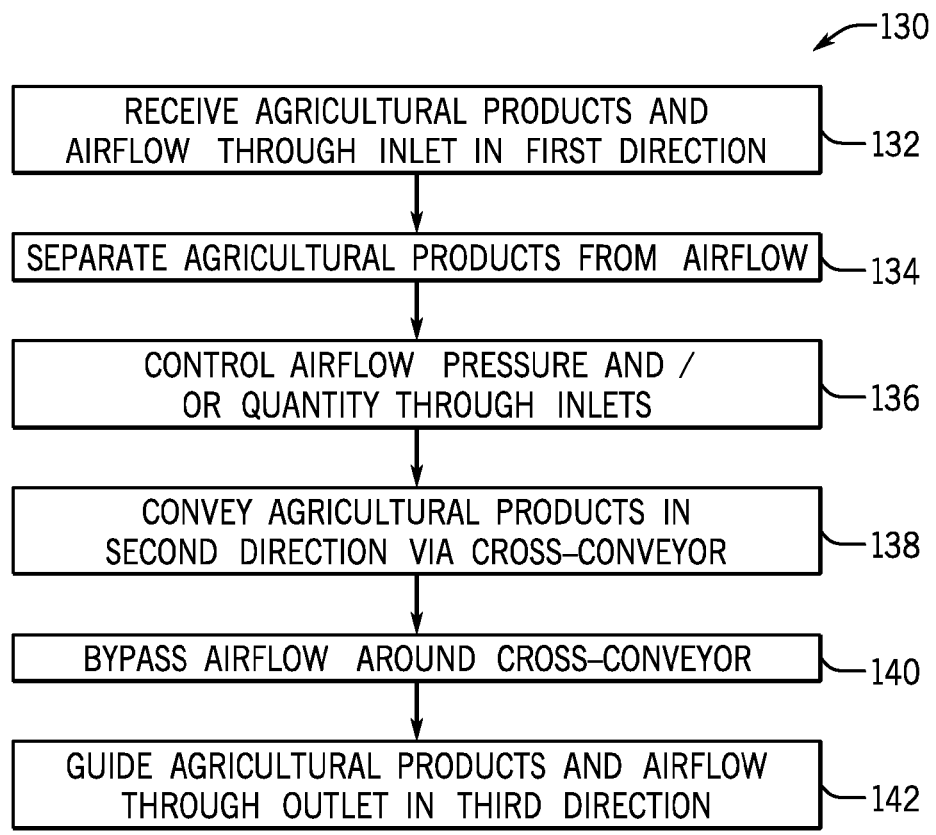
FIG. 5 is a flow diagram of an embodiment of a method for operating the agricultural conveyor system.

FIG. 5 is a flowchart of an embodiment of a method 130 for operating the agricultural conveyor system 10. First, one or more inlets receive (block 132) the agricultural product flows and airflows. Both the agricultural product flows and the airflows are directed through the one or more inlets in a first direction. The agricultural product flows and the airflows are separated (block 134) by a separator in the inlet. The separator may be a screen, filter, or mechanical separation mechanism that directs the agricultural product to the cross-conveyor, and directs the airflow to the bypass conduit. Within the bypass conduit, airflow controls control (block 136) the quantity and/or the pressure of the airflow through each inlet. As described above, dampers in various locations (e.g., inlet, manifold, etc.) may be used to control the airflows. In some embodiments, the airflow controls may substantially balance the quantity and/or the pressure of the airflows through each inlet, which may balance the agricultural product flow through each inlet.

The cross-conveyor conveys (block 138) the agricultural products from the separator in the second direction. The cross-conveyor may be a mechanical system or a fluid system separate from the circulation system that directs the airflow through the inlets. The cross-conveyor may direct the agricultural products to a blow box portion. The bypass conduit directs (block 140) the airflow around the cross-conveyor (i.e., bypassing the cross-conveyor) to the blow box portion. At the blow box portion, the agricultural products mix with the airflow, and the outlet guides (block 142) the mixed flow in the third direction to the bin or packager (e.g., baler). As may be appreciated, the agricultural conveyor system may continually perform the method 130 as the harvesting system moves across the field.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural conveyor system comprising:
 a first inlet configured to receive an airflow and an agricultural product, wherein the inlet comprises an intake damper configured to adjust the airflow received through the first inlet, and the airflow is configured to guide the agricultural product in a first direction substantially parallel to a travel direction of the agricultural conveyor system;
 wherein the intake damper is adjusted by a controller to control at least one of a speed, pressure, and flow rate of the airflow through the first inlet to control the movement of agricultural product to the cross-conveyor through the first inlet, wherein the controller is configured to control the intake damper to balance the airflow through the first inlet with airflow through a second inlet,
 a cross-conveyor coupled to the first inlet and configured to convey the agricultural product from the first inlet to an outlet in a second direction crosswise to the first direction, wherein the intake damper is upstream of the cross-conveyor relative to the first direction;
 a circulation system configured to direct the airflow from the first inlet to the outlet, wherein the circulation system bypasses the cross-conveyor such that a majority portion of the airflow does not flow through the cross-conveyor in the second direction; and
 the outlet coupled to the cross-conveyor, wherein the outlet is configured to receive the agricultural product from the cross-conveyor and to receive the majority portion of the airflow from the circulation system, and the majority portion of the airflow is configured to guide the agricultural product through the outlet in a third direction substantially parallel to the travel direction.

2. The agricultural conveyor system of claim 1, comprising a separator coupled to the first inlet, wherein the separator is configured to direct the agricultural product from the first inlet to the cross-conveyor and to facilitate flow of the majority portion of the first airflow from the first inlet to the circulation system.

3. The agricultural conveyor system of claim 1, wherein the cross-conveyor comprises a mechanical conveyor system.

4. The agricultural conveyor system of claim 1, wherein the cross-conveyor comprises a second circulation system configured to direct a second airflow through the cross-conveyor, and the second airflow is configured to guide the agricultural product in the second direction.

5. The agricultural conveyor system of claim 1, wherein the circulation system comprises a bypass duct configured to direct the majority portion of the airflow from the first inlet to the outlet.

6. The agricultural conveyor system of claim 5, wherein the circulation system comprises a fan, the fan intakes the majority portion of the airflow from the first inlet, and the fan outputs the majority portion of the airflow through the outlet.

7. An agricultural harvesting system, comprising:
a first plurality of inlets, wherein each inlet of the first plurality of inlets is configured to receive a respective first airflow and a respective first agricultural product flow, each first airflow is configured to guide the respective first agricultural product flow in a first direction through a respective inlet of the first plurality of inlets, and the first direction is substantially parallel to a travel direction of the agricultural harvesting system;
a first cross-conveyor coupled to the first plurality of inlets and configured to convey the first agricultural product flows from the first plurality of inlets to a first outlet in a second direction crosswise to the first direction, wherein the first plurality of inlets is arranged along a first longitudinal axis of the first cross-conveyor;
a plurality of dampers, wherein each damper of the plurality of dampers is configured to control the first airflows through the respective inlets of the first plurality of inlets to be substantially equal wherein the plurality of dampers is configured to control each first airflow such that the first airflows are balanced among the first plurality of inlets;
a circulation system configured to direct the first airflows from the first plurality of inlets to the first outlet, wherein the circulation system bypasses the first cross-conveyor such that respective majority first portions of the first airflows do not flow through the first cross-conveyor in the second direction; and
the first outlet coupled to the first cross-conveyor, wherein the first outlet is configured to receive the first agricultural product flows from the first cross-conveyor and to receive the respective majority first portions of the first airflows from the circulation system, and the respective majority first portions of the first airflows are configured to guide the first agricultural product flows through the first outlet in a third direction substantially parallel to the travel direction.

8. The agricultural harvesting system of claim 7, wherein the plurality of dampers is configured to control each first airflow such that the first airflows have equal pressures among the first plurality of inlets.

9. The agricultural harvesting system of claim 7, comprising:
a second plurality of inlets, wherein each inlet of the second plurality of inlets is configured to receive a respective second airflow and a respective second agricultural product flow, each second airflow is configured to guide the respective second agricultural product flow in the first direction through a respective inlet of the second plurality of inlets;
a second cross-conveyor coupled to the second plurality of inlets and configured to convey the second agricultural product flows from the second plurality of inlets to a second outlet in a fourth direction crosswise to the first direction and substantially opposite to the second direction, wherein the second plurality of inlets is arranged along a second longitudinal axis of the second cross-conveyor; and
the second outlet coupled to the second cross-conveyor, wherein the second outlet is configured to receive the second agricultural product flows from the second cross-conveyor and to receive respective majority second portions of the second airflows from the circulation system, and the respective majority second portions of the second airflows are configured to guide the second agricultural product flows through the second outlet in the third direction;
wherein the circulation system is configured to direct the respective majority second portions of the second airflows from the second plurality of inlets to the second outlet, wherein the circulation system bypasses the second cross-conveyor such that the respective majority second portions of the second airflows do not flow through the second cross-conveyor in the fourth direction.

10. The agricultural harvesting system of claim 9, wherein the circulation system comprises a first fan configured to drive the first airflows and a second fan configured to drive the second airflows.

11. The agricultural harvesting system of claim 7, wherein the agricultural harvesting system is a component of a self-propelled vehicle, and the self-propelled vehicle is configured to move in the travel direction.

12. The agricultural harvesting system of claim 7, comprising a header configured to couple to a self-propelled vehicle, wherein the header comprises the first plurality of inlets, the first cross-conveyor, and the first outlet.

13. The agricultural harvesting system of claim 7, wherein the first agricultural product flow comprises cotton.

14. The agricultural harvesting system of claim 7, wherein the plurality of dampers comprises a plurality of intake dampers, wherein each intake damper is coupled to an inlet of the first plurality of inlets, and each intake damper is configured to adjust the respective first airflow received through the respective inlet.

15. A method of harvesting an agricultural product, comprising:
guiding the agricultural product through a plurality of inlets in a first direction with a first plurality of airflows, wherein the first direction is substantially parallel to a travel direction;
separating the agricultural product from the first plurality of airflows, and directing the agricultural product to a cross-conveyor;
controlling a plurality of intake dampers to balance respective pressures of the first plurality of airflows through the respective plurality of inlets, wherein controlling the plurality of intake dampers to balance respective pressures balances the agricultural product to the cross-conveyor through each inlet of the plurality of inlets, wherein the plurality of intake dampers is disposed upstream of the cross-conveyor relative to the first direction;
conveying the agricultural product through the cross-conveyor from the plurality of inlets to an outlet in a second direction, wherein the second direction is crosswise to the first direction; and
guiding the agricultural product through the outlet in a third direction with a second airflow, wherein the third direction is substantially parallel to the travel direction, and the second airflow comprises the first plurality of airflows.

16. The method of claim 15, wherein each inlet of the plurality of inlets comprises a respective intake damper of the plurality of intake dampers.

17. The method of claim 15, comprising controlling a plurality of manifold dampers and the plurality of intake dampers to balance respective pressures of the first plurality of airflows through the plurality of inlets, wherein the plurality of manifold dampers are disposed downstream of a separator relative to the first direction, the plurality of intake dampers are disposed upstream of the separator relative to the first direction, and the separator is configured to separate the agricultural product from the first plurality of airflows.

18. The method of claim 15, comprising guiding the separated first plurality of airflows from the inlet to the outlet through a circulation system such that the first plurality of airflows bypasses the cross-conveyor, wherein the circulation system comprises a fan and a bypass duct.

19. The method of claim 15, wherein the cross-conveyor comprises a mechanical conveyor system.

* * * * *